United States Patent [19]

Wakabayashi et al.

[11] Patent Number: 4,843,411
[45] Date of Patent: Jun. 27, 1989

[54] CAMERA CONTAINING A LENS BARRIER THEREIN

[75] Inventors: Hiroshi Wakabayashi, Yokohama; Daiki Tsukahara, Kawasaki; Kiyosada Machida, Urawa; Yuji Katano; Hidenori Miyamoto, both of Kawasaki, all of Japan

[73] Assignee: Nikon Corporation, Tokyo, Japan

[21] Appl. No.: 162,447

[22] Filed: Mar. 1, 1988

[30] Foreign Application Priority Data

Mar. 10, 1987 [JP] Japan .............................. 62-33890[U]

[51] Int. Cl.$^4$ ............................................. G03B 17/04
[52] U.S. Cl. ............................................. 354/187
[58] Field of Search ................ 350/587; 354/253, 288, 354/187, 202

[56] References Cited

U.S. PATENT DOCUMENTS 4,752,796 6/1988 Tsukahara et al. ................ 354/187

Primary Examiner—Michael L. Gellner
Attorney, Agent, or Firm—Shapiro and Shapiro

[57] ABSTRACT

A camera containing a lens barrier therein is comprised of a helicoid rotatable about the optic axis, a rectilinear barrel threadably engaged with the inner side of the helicoid and having a holding portion for a lens barrier holding a photo-taking lens and protecting the photo-taking lens, a guide plate extending in the direction of the optic axis and engaged with the rectilinear barrel to rectilinearly guide the same through a cut-away groove, and a lens barrier held in the lens barrier holding portion and opened and closed in front of the photo-taking lens. The guide plate and the lens barriers are designed so as to be capable of overlapping each other in the direction of the optic axis, and the guide plate is designed so as not to hamper the opening-closing of the lens barriers even when they are in the overlapping position.

4 Claims, 2 Drawing Sheets

4,843,411

CAMERA CONTAINING A LENS BARRIER THEREIN

BACKGROUND OF THE INVENTION

Field of the Invention and Related Art Statement

This invention relates to improvements in a camera containing therein a lens cover for protecting a photo-taking lens.

Some cameras are provided with a lens barrier for protecting a photo-taking lens. The lens barrier lies in a plane orthogonal to the optic axis forwardly of the photo-taking lens and must therefore be disposed so as to avoid the interference with a rectilinear key or the like for rectilinearly guiding the axially moved portion of the photo-taking lens (but to guide the axially moved portion over a wide range, it is desirable that the rectilinear key be as long as possible).

However, if the lens barrier and the rectilinear key or the like are disposed while being deviated from each other in the direction of the optic axis to avoid the interference between the two, the length of the lens barrel will become great and the diameter of the opening will become large, and this is contrary to the requirement for the compactness of the camera.

OBJECT AND SUMMARY OF THE INVENTION

The present invention has been made with a view to solve the above-noted problem peculiar to the prior art, that is, to provide a camera in which a rectilinear key and a lens barrier are not deviated from each other in the direction of the optic axis (the two may overlap each other depending on the position of a rectilinear barrel) and the rectilinear key extending in the direction of the optic axis and the lens barrier lying in a plane orthogonal to the optic axis are disposed without interfering with each other.

To solve the above-noted problem, in the present invention, the rectilinear key is made as long as possible in the direction of the optic axis (whereby the guide characteristic of a rectilinear barrel is improved) and moreover, the rectilinear key and the lens barrier are disposed in such a positional relation that during the opening-closing of the lens barrier, the lens barrier does not interfere with the rectilinear key.

DESCRIPTION OF THE PREFERRED EMBODIMENT

An embodiment of the present invention will hereinafter be described with reference to the drawings.

Figure 1:
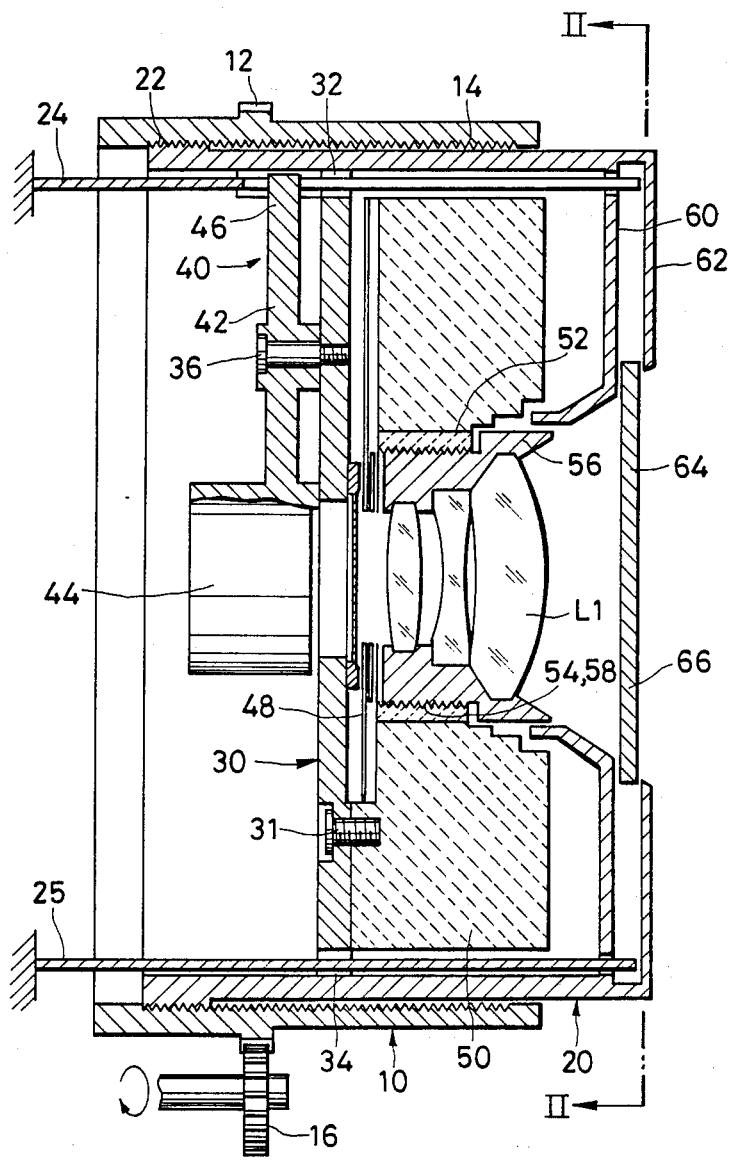
FIG. 1 is a front sectional view showing an embodiment of the present invention.

Referring to FIG. 1, a rotatable barrel 10 has a gear 12 formed on the outer peripheral surface thereof and has a helicoid 14 formed on the inner peripheral surface thereof substantially over the full length thereof. A pinion gear 16 rotatable by a motor, not shown, is in meshing engagement with the gear 12, and a helicoid 22 formed on the outer peripheral surface of a rectilinear barrel 20 fitted to the inside of the barrel 10 is threadably engaged with the helicoid 14.

Figure 3:
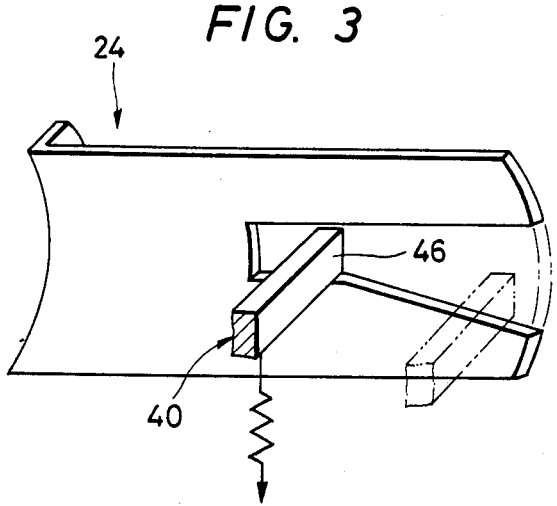
FIG. 3 is a perspective view showing a guide plate.

A disc-like mounting base plate 30 is fixed to the rectilinear barrel 20, and cut-away grooves 32 and 34 are formed in portions of the outer peripheral edge thereof. From the fixed portion of a camera body, guide plates 24 and 25 extend inside the rectilinear barrel 20 in the direction of the optic axis and pass through the cut-away grooves 32 and 34, respectively. The arm 42 of a lens frame 40 is pivotally mounted on the base plate 30 by a shaft 36, and the lens frame 40 has a cylindrical lens holding portion 44 and a projection 46 which extends into a bifurcated portion (see FIG. 3) formed in the guide plate 24. A second lens unit (not shown) is held in the lens holding portion 44.

When the barrel 10 is rotated by rotation of the pinion 16, the rectilinear barrel 20 is moved in the direction of the optic axis without being rotated, through the intermediary of the meshing engagement between the helicoids 14 and 22, because the guide plates 24 and 25 extend through the cut-away grooves 32 and 34, respectively. As the rectilinear barrel 20 is moved in the direction of the optic axis, the projection 46 is moved along an inclined surface provided in the bifurcated portion of the guide plate 24 and the lens frame 40 is rotated about the shaft 36, whereby the second lens unit in the lens holding portion 44 is moved between a position coincident with the optic axis and a position incoincident with the optic axis.

Within the rectilinear barrel 20, a shutter control device 50 for controlling the driving of a shutter 48 is disposed annularly around a first lens unit L1 and fixed to the base plate 30 by a screw 31, and a lens moving device 52 is made integral therewith. A helicoid 58 formed on the outer peripheral surface of a lens holding member 56 is threadably engaged with a helicoid 54 formed on the inner peripheral surface of the lens moving device 52, and rotation of the moving device 52 causes movement of the lens holding member 56 and the first lens unit L1 in the direction of the optic axis through the helicoids 54 and 58.

The first lens group L1 may also be moved in the direction of the optic axis by the rectilinear barrel 20 being moved in the direction of the optic axis, and as a result, it may assume a telephotoposition in which it has been forwardly axially moved, a wide position in which it has been retracted rearwardly, and any position therebetween.

At the fore end side (the right end side as viewed in FIG. 1) of the rectilinear barrel 20, two hollow disc-like barrier holding portions 60 and 62 are provided so as to lie in a plane orthogonal to the direction of the optic axis, and a pair of lens barriers 64 and 66 are disposed in the hollow portion defined between the two barrier holding portions.

Figure 2:
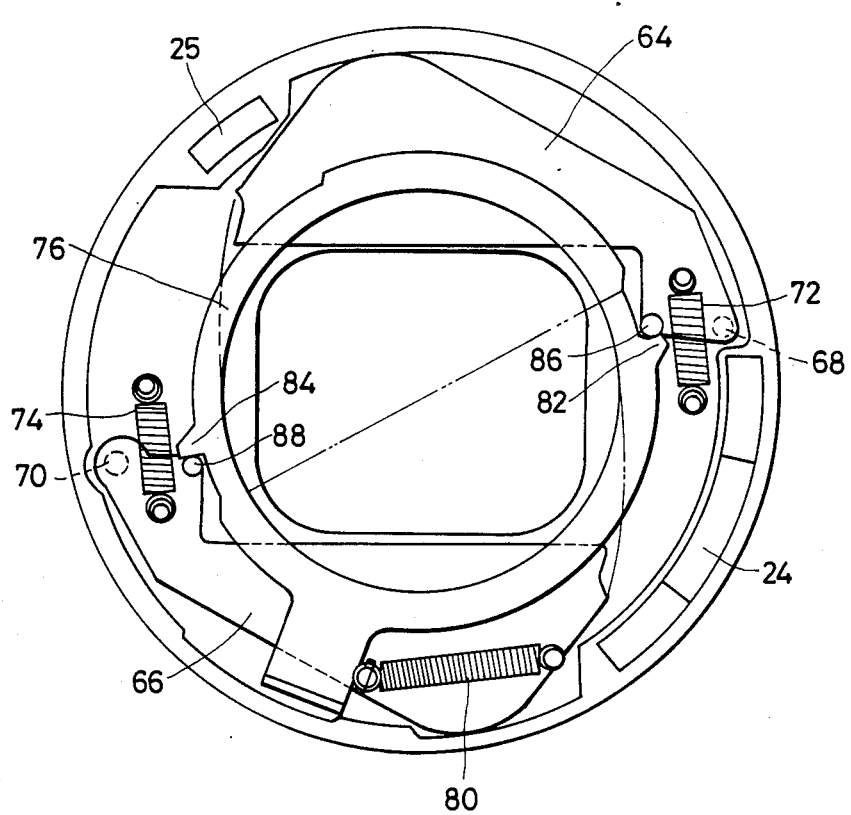
FIG. 2 is a cross-sectional view taken along line II—II of FIG. 1.

As shown in detail in FIG. 2, the lens barriers 64 and 66 are of a substantially right-angled triangular shape, and are pivotally mounted on the barrier holding portion 60 by shafts 68 and 70 so that their oblique lines are opposed to each other. The lens barriers 64 and 66 are biased toward each other, i.e., in a closing direction, by springs 72 and 74 provided between them and the barrier holding portions 60. Also, a drive ring 76 is disposed in proximity to the lens barriers 64 and 66 so as to be rotatable about the optic axis, and is biased counterclockwise (as viewed in FIG. 2) by a spring 80 provided between it and the barrier holding portion 60, and in engagement portions 82 and 84, it is engageable with pins 86 and 88 studded in the lens barriers 64 and 66. In FIG. 1, the shafts 68, 70, the springs 72, 74, 80, the drive ring 76 and the pins 86, 88 are omitted.

When the drive ring 76 is turned counter-clockwise, the lens barriers 64 and 66 are pivotally moved about the shafts 68 and 70 by the engagement between the engagement portions 72, 84 and the pins 86, 88 to thereby open the front of the first lens unit L1.

The guide plate 24 and the rectilinear barrel 20 are designed such that when the first lens unit L1 is on the telephotoside and the guide plate 24 is in its advanced position, the tip end of the guide plate 24 lies between the barrier holding portions 60 and 62 as shown in FIG. 1, that is, extends through one barrier holding portion 60 and overlaps the lens barriers 64 and 66 in the direction of the optic axis. Therefore, the length of the lens barrel in the direction of the optic axis can be reduced to a small value.

Moreover, even in a state in which the lens barriers 64 and 66 have been pivotally moved to their open positions, there is no fear that lens barriers 64 and 66 interfere with the guide plate 24, as is apparent from FIG. 2.

The present invention is not restricted to the above-described embodiment, but of course can be suitably changed or improved within a scope which will not spoil the gist thereof. For example, the provision of the second lens unit and the fact that the first lens unit L1 is provided with two moving means (20 and 56) are not indispensable.

As has hitherto been described, according to the present invention, the guide characteristic of the photo-taking lens is improved, the length of the lens barrel in the direction of the optic axis is reduced to a small value and moreover, the opening-closing of the lens barriers are not hampered. Accordingly, a wide range of photography from the telephoto side to the wide side becomes possible, the entire camera is made compact and the photo-taking lens is reliably protected.

We claim:

1. A camera comprising:
   a photo-taking optical system;
   a first barrel provided for rotation about the optic axis of said photo-taking optical system;
   a second barrel fitted to the inside of said first barrel and holding said photo-taking optical system, said second barrel being responsive to the rotation of said first barrel to be moved along said optic axis between a position protruded from said first barrel and a position retracted from said protruded position into said first barrel;
   a lens barrier member held by said second barrel and movable on a plane substantially perpendicular to said optic axis to cover the front of said photo-taking optical system; and
   a guide member fixedly provided in said camera and coupled to said second barrel and extending in the direction of said optic axis for guiding said second barrel in the direction of said optic axis without rotating said second barrel, said guide member having a tip end portion adapted to intersect said plane off the locus of movement of said lens barrier member when said second barrel is in said retracted position.

2. A camera according to claim 1, wherein said tip end portion of said guide member protrudes further forwardly from said plane when said second barrel is in said retracted position.

3. A camera according to claim 1, wherein said guide member is slidably coupled to a groove provided inside said second barrel.

4. A camera according to claim 1, wherein said second barrel is threadably engaged with said first barrel.

* * * * *